(12) United States Patent
Saito (10) Patent No.: US 8,190,582 B2
(45) Date of Patent: May 29, 2012

(54) MULTI-PROCESSOR

(75) Inventor: Seiichiro Saito, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 411 days.

(21) Appl. No.: 12/129,354

(22) Filed: May 29, 2008

(65) Prior Publication Data

US 2009/0006437 A1    Jan. 1, 2009

(30) Foreign Application Priority Data

May 31, 2007  (JP) ................................ 2007-145264

(51) Int. Cl.
G06F 17/30 (2006.01)
G06F 17/00 (2006.01)
G06F 7/00 (2006.01)

(52) U.S. Cl. .......................... 707/687; 375/240; 714/18
(58) Field of Classification Search ........... 707/999.107; 382/232; 712/228
See application file for complete search history.

(56) References Cited

U.S. PATENT DOCUMENTS

| | | | |
|---|---|---|---|
| 6,009,205 A | 12/1999 | Yoshida | |
| 6,507,903 B1 * | 1/2003 | Beatty et al. | 711/173 |
| 6,762,764 B2 | 7/2004 | Hiwada et al. | |
| 7,092,965 B2 * | 8/2006 | Easwar | 1/1 |
| 7,685,409 B2 * | 3/2010 | Du et al. | 712/228 |
| 2001/0033617 A1 * | 10/2001 | Karube et al. | 375/240.12 |
| 2005/0062746 A1 | 3/2005 | Kataoka et al. | |
| 2005/0160200 A1 | 7/2005 | Saito | |

FOREIGN PATENT DOCUMENTS

| | | |
|---|---|---|
| JP | 64-68755 | 3/1989 |
| JP | 9-84004 | 3/1997 |
| JP | 10-145739 | 5/1998 |
| JP | 2000-115277 | 4/2000 |
| JP | 2001-27986 | 1/2001 |
| JP | 2004-356850 | 12/2004 |
| JP | 2006-20417 | 1/2005 |
| JP | 2005-70938 | 3/2005 |

OTHER PUBLICATIONS

Official Action mailed Feb. 15, 2011 from by Japanese Patent Office for Japanese Patent Application No. JP 2007-145264, 2 pages.
English language translation of Official Action mailed Feb. 15, 2011 from by Japanese Patent Office for Japanese Patent Application No. JP 2007-145264, 3 pages.
Japanese Office Action and its English Translations for Japanese Patent Application No. 2007-145264 mailed Dec. 20, 2011, 5 pages.

* cited by examiner

Primary Examiner — Yicun Wu

(74) Attorney, Agent, or Firm — Sprinkle IP Law Group (57) ABSTRACT

A multi-processor according to an example of the invention comprises a first control unit which stores first compressed data acquired externally in a first memory, a hardware decoding unit which decodes the first compressed data stored in the first memory and storing the decoded data in a second memory, an encoding processor element which includes at least one of a plurality of processor elements, encodes the decoded data stored in the second memory in accordance with encoding software stored in a third memory, and stores second compressed data obtained by encoding the decoded data in a fourth memory, and a second control unit which outputs the second compressed data stored in the fourth memory to the outside.

7 Claims, 9 Drawing Sheets

MULTI-PROCESSOR

CROSS-REFERENCE TO RELATED APPLICATIONS

This application is based upon and claims the benefit of priority from prior Japanese Patent Application No. 2007-145264, filed May 31, 2007, the entire contents of which are incorporated herein by reference.

BACKGROUND OF THE INVENTION

1. Field of the Invention

The present invention relates to a multi-processor including a plurality of processor elements.

2. Description of the Related Art

Patent reference 1 (Jpn. Pat. Appln. KOKAI Publication No. 2004-356850) discloses a compressed moving image encoding apparatus including a software unit which decompresses compressed moving image data by software, a data storage unit which stores the moving image data processed by the software processing unit, and a hardware processing unit which performs compression processing for moving image data in the data storage unit by using hardware.

Patent reference 2 (Jpn. Pat. Appln. KOKAI Publication No. 2001-27986) discloses a data processing apparatus including a software processing unit which implements predetermined data processing by using software, and a hardware processing unit which implements predetermined data processing by using hardware.

Patent reference 3 (Jpn. Pat. Appln. KOKAI Publication No. 2000-115277) discloses an arrangement including a first codec formed by hardware and a second codec which performs encoding/decoding by executing software.

Patent reference 4 (Jpn. Pat. Appln. KOKAI Publication No. 9-84004) discloses a technique of using microprocessors capable of parallel processing to process a portion including many complicated computations and using hardware including a block loader or a VLC decoder to perform processing which is relatively simple but is essentially difficult to parallelize.

Patent reference 5 (Jpn. Pat. Appln. KOKAI Publication No. 2005-70938) discloses a signal processing apparatus which implements a high throughput and high flexibility by load distribution using software and hardware in signal processing using an image compression/decompression algorithm with a large processing amount.

With the recent popularization of terrestrial digital broadcasting and BS high-definition broadcasting, video data associated with these broadcastings are processed by DVD recorders, personal computers, and the like. The number of software applications for processing video data such as terrestrial digital broadcasting and BS high-definition broadcasting data may tend to increase.

When a personal computer performs transcodec of converting video data compressed in a given format into video data compressed in another format, since the CPU (Central Processing Unit) performs processing for transcodec, the load concentrates on the CPU. The transcodec includes a decoding processing for encoded data encoded by a method such as mpeg2, H.264, or the like, and an encoding processing for decoded data by the decoding processing such as exchanging a specific format, bit rate, resolution, or the like.

When the CPU intensively processes transcodec, the processing speed of another software application executed by the CPU may decrease. In addition, as the load is applied to the CPU, it may become difficult to execute transcodec itself in real time.

When a GPU (Graphics Processing Unit) is to perform transcodec, since the GPU is essentially a processor for computer graphics processing, the cost effectiveness of the processing to be executed decreases. In addition, as systems which handle video data, systems which use the video output functions of a chip set and include no GPU are widely used.

BRIEF SUMMARY OF THE INVENTION

A multi-processor according to the first example of the present invention comprises a first control unit which stores first compressed data acquired externally in a first memory, a hardware decoding unit which decodes the first compressed data stored in the first memory and storing the decoded data in a second memory, an encoding processor element which includes at least one of a plurality of processor elements, encodes the decoded data stored in the second memory in accordance with encoding software stored in a third memory, and stores second compressed data obtained by encoding the decoded data in a fourth memory, and a second control unit which outputs the second compressed data stored in the fourth memory to the outside.

A multi-processor according to the second example of the present invention comprises a first control unit which stores first compressed data acquired externally in a first memory, a hardware decoding unit which decodes the first compressed data stored in the first memory and stores decoded data in a second memory, an editing processor element which includes at least one of a plurality of processor elements, and generates edited data by editing the decoded data stored in the second memory in accordance with editing software stored in a third memory, an encoding processor element which includes at least one of the plurality of processor elements, encodes the edited data generated by the editing processor element in accordance with encoding software stored in a fourth memory, and stores second compressed data obtained by encoding in a fifth memory, and a second control unit which outputs the second compressed data stored in the fifth memory to the outside.

A multi-processor according to the third example of the present invention comprises a first control unit which stores first compressed data acquired externally in a first memory, a hardware decoding unit which decodes the first compressed data stored in the first memory and stores decoded data in a second memory, an editing processor element which includes at least one of a plurality of processor elements, and generates edited data by editing the decoded data stored in the second memory in accordance with editing software stored in a third memory, a hardware encoding unit which encodes the edited data generated by the editing processor element and stores second compressed data obtained by encoding in a fourth memory, and a second control unit which outputs the second compressed data stored in the fourth memory to the outside.

DETAILED DESCRIPTION OF THE INVENTION

The embodiments of the present invention will be described below with reference to the views of the accompanying drawing. Note that the same reference numerals denote parts having similar functions in the following views of the drawing, and a repetitive description will be omitted.

First Embodiment

This embodiment exemplifies a multi-processor which decodes (decompresses) compressed video data by hardware, because video data is often compressed in a fixed format, and flexibly encodes video data by software using a programmable processor element (e.g., a DSP: Digital Signal Processor) which can convert data into formats corresponding to various devices.

Figure 1:
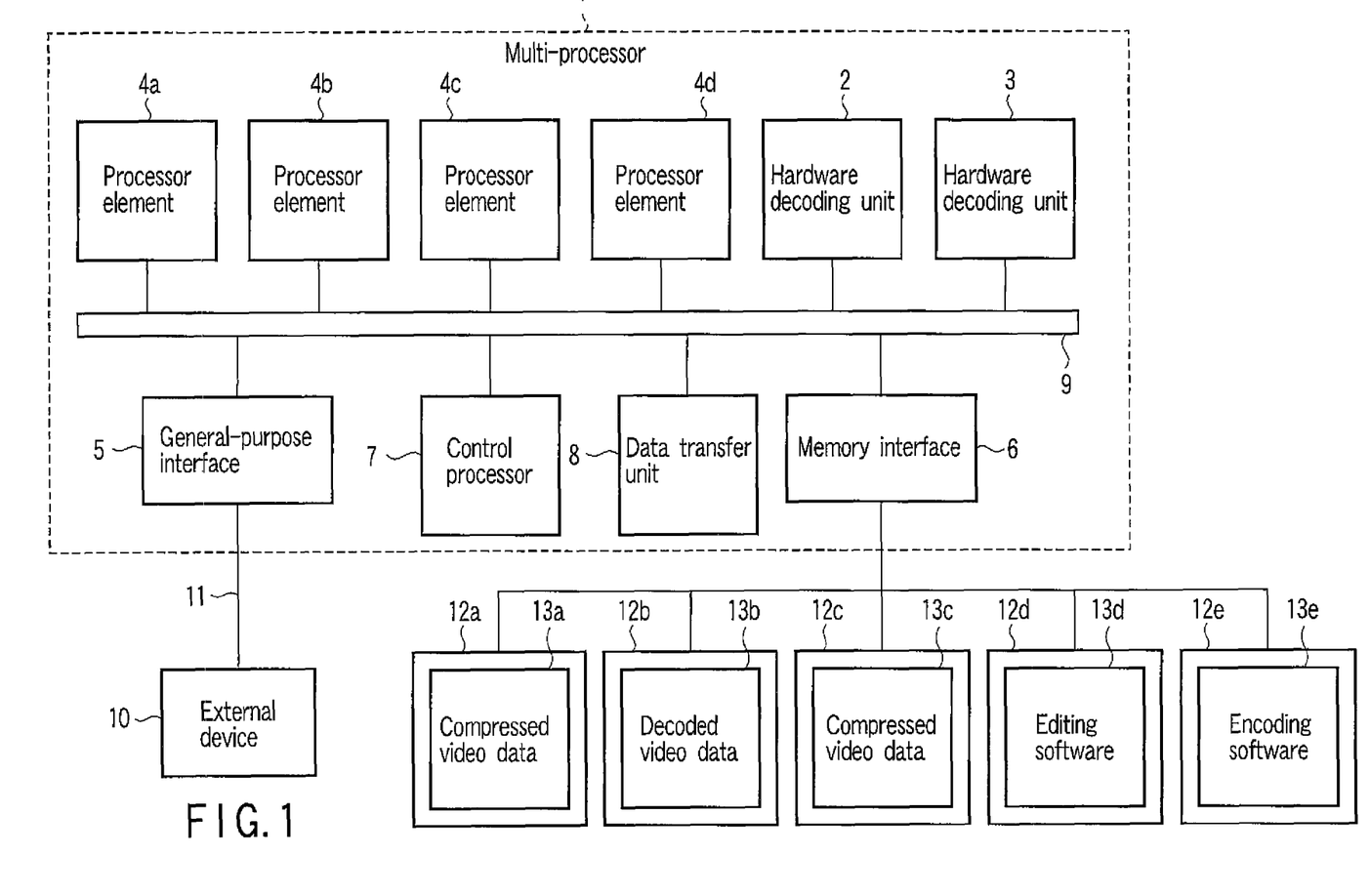
FIG. 1 is a block diagram showing an example of a multi-processor according to the first embodiment of the present invention.

FIG. 1 is a block diagram showing an example of the multi-processor according to this embodiment.

A multi-processor 1 has an arrangement in which a hardware decoding unit 2, a hardware decoding unit 3, a plurality of processor elements 4a to 4d, a high-speed general-purpose interface (PCIe I/F) 5 such as PCI Express, a memory interface 6, a control processor 7, a data transfer unit (DMAC: Direct Memory Access Controller) 8, and the like are connected to each other through an internal bus (Interconnect Network) 9.

The general-purpose interface 5 exchanges data with an external device 10 via a bus 11.

The memory interface (memory controller) 6 is connected to memories 12a to 12e which are used by the hardware decoding units 2 and 3 and the processor elements 4a to 4d.

The memories 12a to 12e respectively store compressed video data 13a received by the multi-processor 1, video data 13b obtained by decoding the compressed video data 13a, compressed video data 13c obtained by editing/compressing the video data 13b, editing software 13d, and encoding software 13e. Note that the memories 12a to 12e can be arbitrarily combined with each other. For example, the memories 12a to 12e can be implemented by one memory.

At least one of the memories 12a to 12e may store various contents such as an operating system used for the control processor 7 which controls the processor elements 4a to 4d, referred image data in the decoding executing, and the like.

The control processor 7 is a processor which controls the hardware decoding units 2 and 3, the processor elements 4a to 4d, the data transfer unit 8, and the like.

The data transfer unit 8 performs data transfer between the general-purpose interface 5 and the memory interface 6.

The hardware decoding unit 2 comprises hardware which decodes data compressed in the first format (e.g., mpeg2/mpeg1).

The hardware decoding unit 3 comprises hardware which decodes data compressed in the second format (e.g., H.264/VC1).

The processor elements 4a to 4d can perform parallel operation under the control of the control processor 7. At least one of the processor elements 4a to 4d executes the editing software 13d in the memory 12d in accordance with the control processor 7 to generate edited data.

At least one of the processor elements 4a to 4d executes the encoding software 13e in the memory 12e in accordance with the control processor 7, and encodes various types of data such as the decoded video data 13b or edited data.

This embodiment exemplifies the case in which the multi-processor 1 comprises the four processor elements 4a to 4d, the number of processor elements incorporated in the multi-processor 1 can be arbitrarily changed as long as the number of processor elements is two or more.

That is, in the multi-processor 1, the hardware decoding unit 2 or 3 which is hardware decodes data, and the encoding software 13e operating on at least one of the processor elements 4a to 4d encodes data.

The resolution of video data and the number of formats are fixedly set by, for example, the specifications of terrestrial digital broadcasting, satellite digital broadcasts, cable television, HD-DVD, and Blu Ray. In this embodiment, therefore, the hardware decoding unit 2 or 3 which is hardware decodes the compressed video data 13a. In general, implementing a given process by using hardware will reduce the chip area.

There are various types of apparatuses which play back compressed video data, including, for example, cellular phones, portable video players, DVD recorders, game machines and computer systems. No unified resolution or format is set for such various types of playback apparatuses for compressed video data. In many cases, the manufacturers of the respective products freely determine resolutions and formats. In the multi-processor 1 according to this embodiment, therefore, in order to flexibly encode video data in accordance with the format of a playback apparatus for the compressed video data, the processor elements 4a to 4d perform encoding of video data by using the encoding software 13e.

The encoding software 13e can be updated, and hence can cope with changes in the specifications of the playback apparatus for compressed video data or encoding after the multi-processor 1 is shipped out.

Processing by the multi-processor 1 having the above arrangement will be described with reference to FIGS. 2 to 5.

Figure 2:
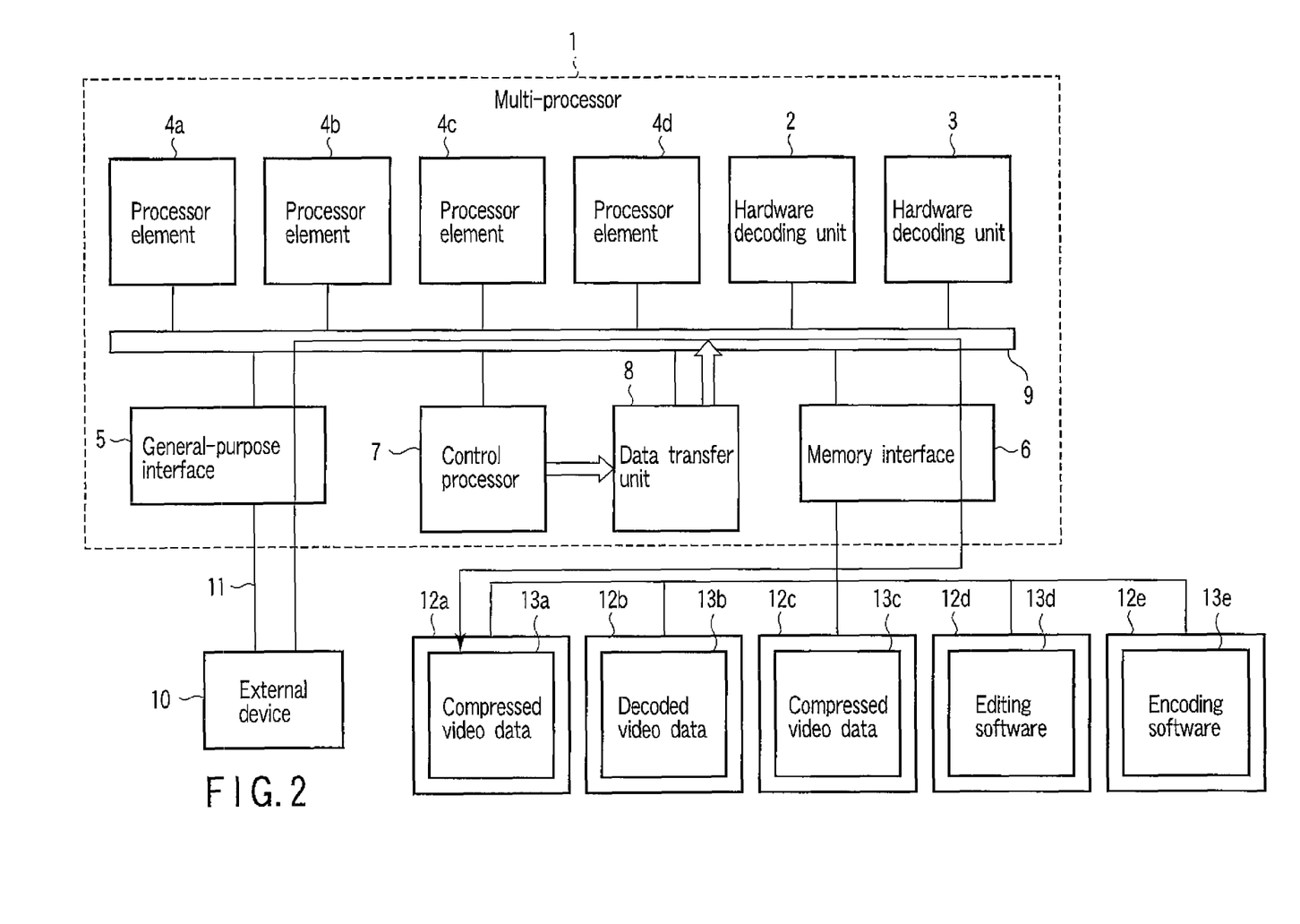
FIG. 2 is a block diagram showing an example of operation up to storing compressed video data in the memory upon receiving the compressed video data in the first embodiment.

FIG. 2 is a block diagram showing an example of operation up to storing the compressed video data 13a in the memory 12a upon receiving it in this embodiment (first step).

The control processor 7 controls the data transfer unit 8. The data transfer unit 8 transfers the compressed video data (compressed video stream) 13a, received by the general-purpose interface 5 from the external device 10 via the bus 11, to the memory interface 6 via the internal bus 9. The memory interface 6 stores the compressed video data 13a in the memory 12a.

More specifically, the control processor 7 supplies a transfer source address, a transfer destination address, a transfer data size, and a transfer instruction to the data transfer unit 8. The data transfer unit 8 stores the transfer source address, the transfer destination address, and the transfer data size in the internal register. In accordance with the contents of this register, the data transfer unit 8 transfers the compressed video data 13*a* from the general-purpose interface 5 to the memory interface 6 via the internal bus 9, and stores the compressed video data 13*a* in the memory 12*a*.

Figure 3:
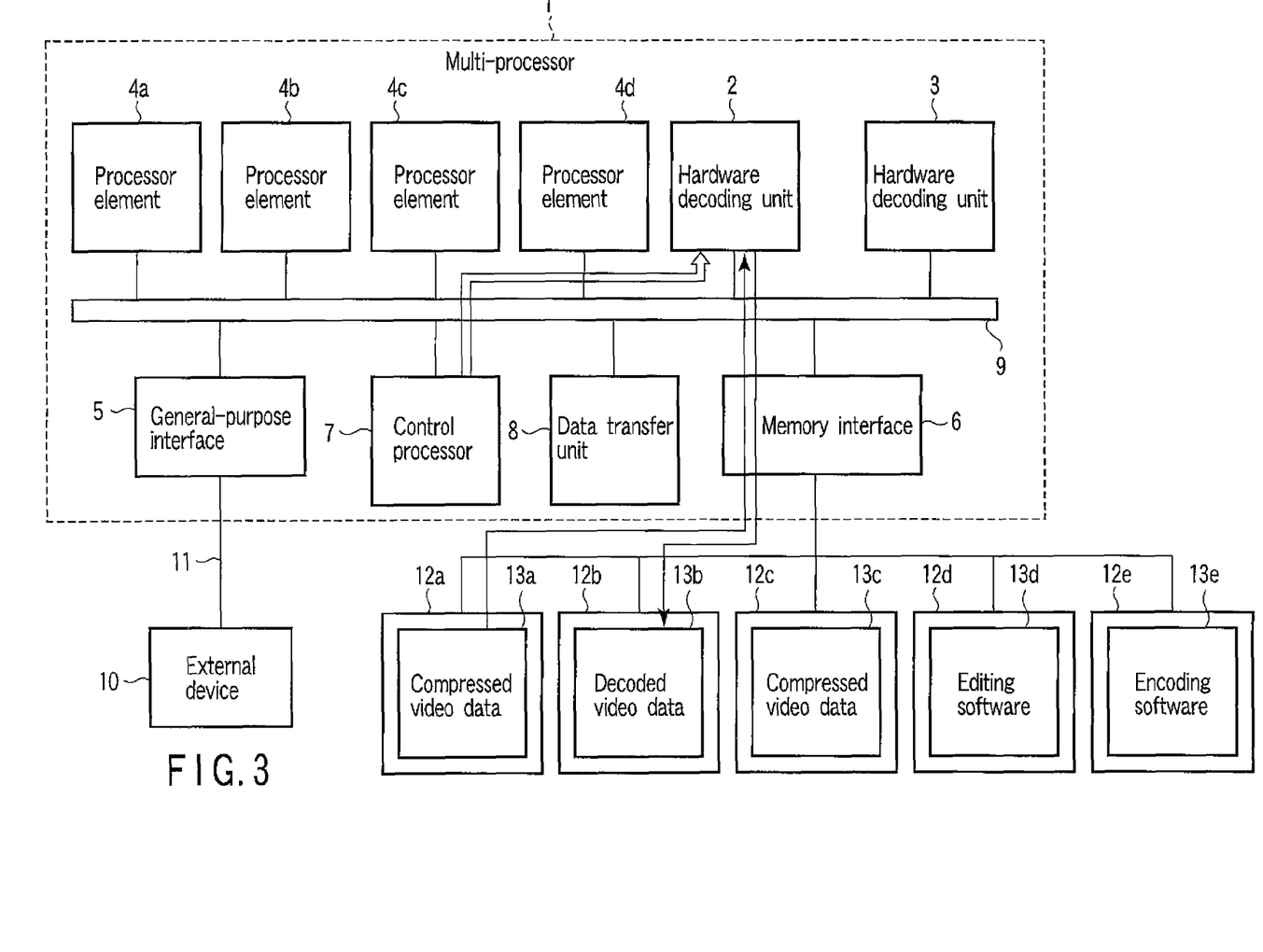
FIG. 3 is a block diagram showing an example of operation up to decoding the compressed video data and storing decoded video data in the memory in the first embodiment.

FIG. 3 is a block diagram showing an example of operation up to decoding the compressed video data 13*a* and storing the decoded video data 13*b* in the memory 12*b* (second step). Although FIG. 3 exemplifies the case in which the hardware decoding unit 2 is used, the same applies to a case in which the hardware decoding unit 3 is used.

The control processor 7 controls the hardware decoding unit 2. The hardware decoding unit 2 acquires the compressed video data 13*a* stored in the memory 12*a* via the memory interface 6 and the internal bus 9, decodes the compressed video data 13*a*, and stores the decoded video data 13*b* in the memory 12*b* via the internal bus 9 and the memory interface 6.

More specifically, the control processor 7 supplies a read address, a write address, and a decode instruction to the hardware decoding unit 2. The hardware decoding unit 2 stores the read address and the write address in the internal register. In accordance with the contents of this register, the hardware decoding unit 2 reads out the compressed video data 13*a* from the memory 12*a* and writes the decoded video data 13*b* in the memory 12*b*.

Figure 4:
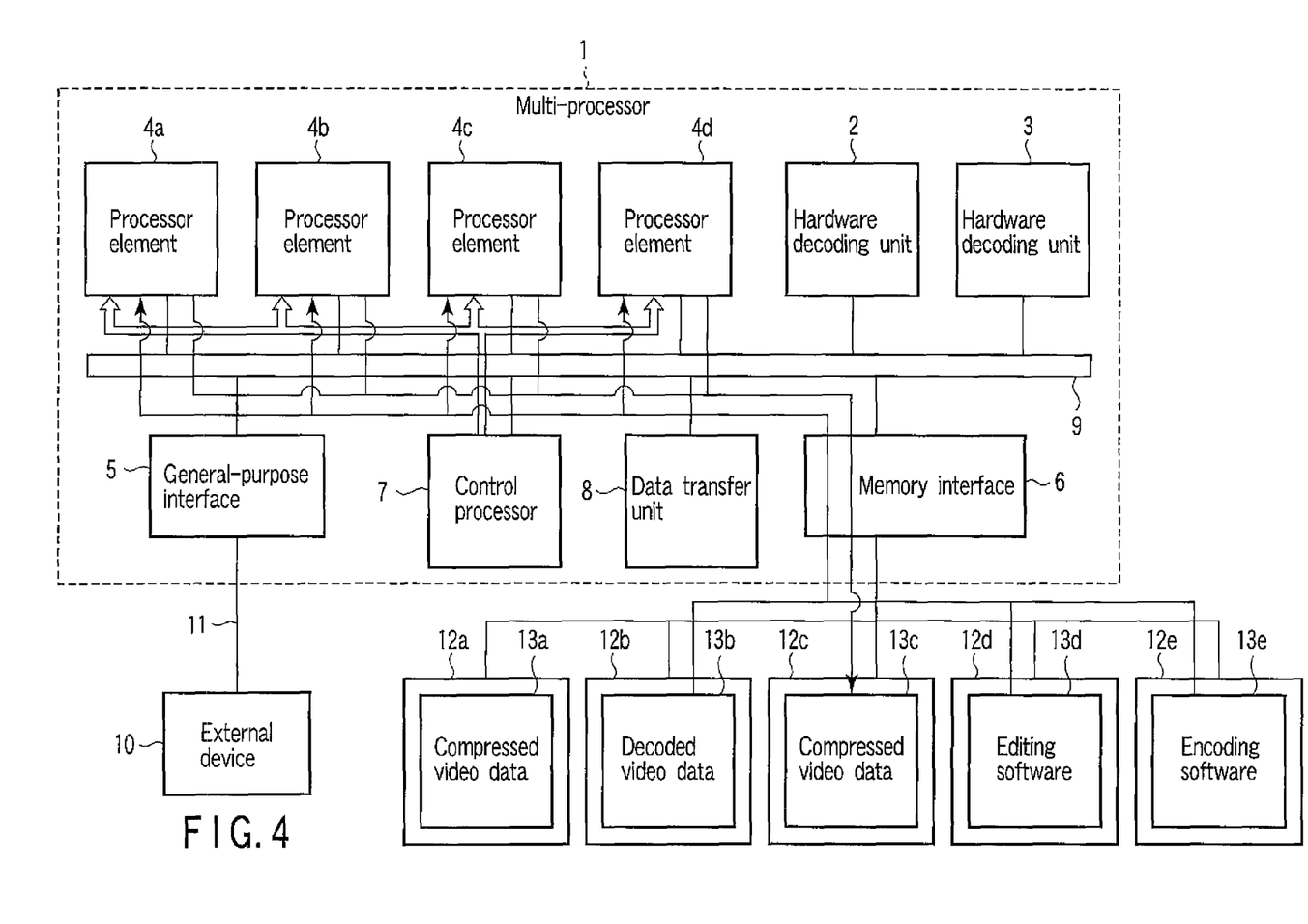
FIG. 4 is a block diagram showing an example of operation up to editing the decoded video data, encoding edited video data, and storing the encoded video data in the memory in the first embodiment.

FIG. 4 is a block diagram showing an example of operation up to editing the decoded video data 13*b*, encoding edited video data, and storing the encoded video data in the memory 12*c* (third step).

The control processor 7 controls at least one of the processor elements 4*a* to 4*d* (in FIG. 4, the processor elements 4*a* to 4*d*). At least one of the processor elements 4*a* to 4*d* accesses the editing software 13*d* stored in the memory 12*d* and the encoding software 13*e* stored in the memory 12*e* via the memory interface 6 and the internal bus 9, acquires the decoded video data 13*b* stored in the memory 12*b*, edits the decoded video data 13*b* by operation based on the editing software 13*d*, encodes the edited data by operation based on the encoding software 13*e*, and stores the compressed video data 13*c* obtained by encoding the edited data in the memory 12*c* via the internal bus 9 and the memory interface 6.

More specifically, the control processor 7 selects at least one of the processor elements 4*a* to 4*d* (in FIG. 4, the processor elements 4*a* to 4*d*) which executes the editing software 13*d* and the encoding software 13*e*. As this selection technique, the control processor 7 can use a technique of selecting one of the processor elements 4*a* to 4*d* which is in a standby state in which no processing is executed or whose processing amount is small. Note that the control processor 7 can execute the editing software 13*d* and the encoding software 13*e* by using all the processor elements 4*a* to 4*d* without selecting at least one of specific processor elements. It suffices to execute the editing software 13*d* and the encoding software 13*e* by using either the same processor element or different processor elements.

The control processor 7 supplies a read address, a write address, an edit instruction, and an encode instruction to the selected processor elements 4*a* to 4*d*. The selected processor elements 4*a* to 4*d* each store the read address and the write address in the internal register. In accordance with the contents of the register, each of the selected processor elements 4*a* to 4*d* reads out the decoded video data 13*b* from the memory 12*b*, and writes the compressed video data 13*c* obtained by editing and encoding in the memory 12*c*.

Figure 5:
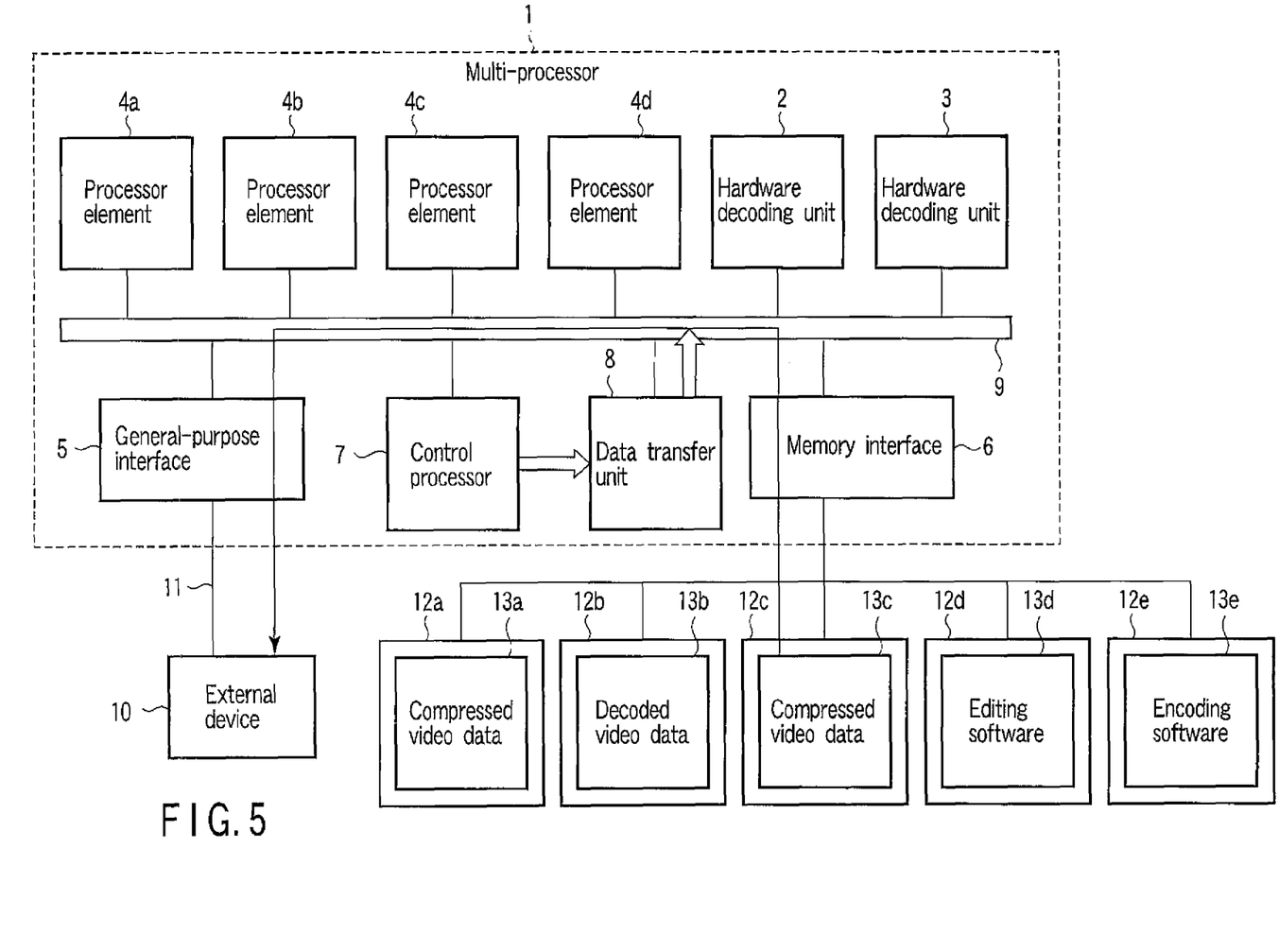
FIG. 5 is a block diagram showing an example of operation of transferring encoded video data stored in the memory to the external device in the first embodiment.

FIG. 5 is a block diagram showing an example of operation of transferring the compressed video data 13*c* stored in the memory 12*c* to the external device 10 (fourth step).

The control processor 7 controls the data transfer unit 8. The data transfer unit 8 transfers the compressed video data 13*c* stored in the memory 12*c* to the general-purpose interface 5 via the memory interface 6 and the internal bus 9. The general-purpose interface 5 transmits the compressed video data 13*c* to the external device 10 via the bus 11.

More specifically, the control processor 7 supplies a transfer source address, a transfer destination address, a transfer data size, and a transfer instruction to the data transfer unit 8. The data transfer unit 8 stores the transfer source address, the transfer destination address, and the transfer data size in the internal register. In accordance with the contents of this register, the data transfer unit 8 transfers the compressed video data 13*c* to the general-purpose interface 5 via the memory interface 6 and the internal bus 9, and transmits the compressed video data 13*c* to the external device 10 via the bus 11.

Figure 6:
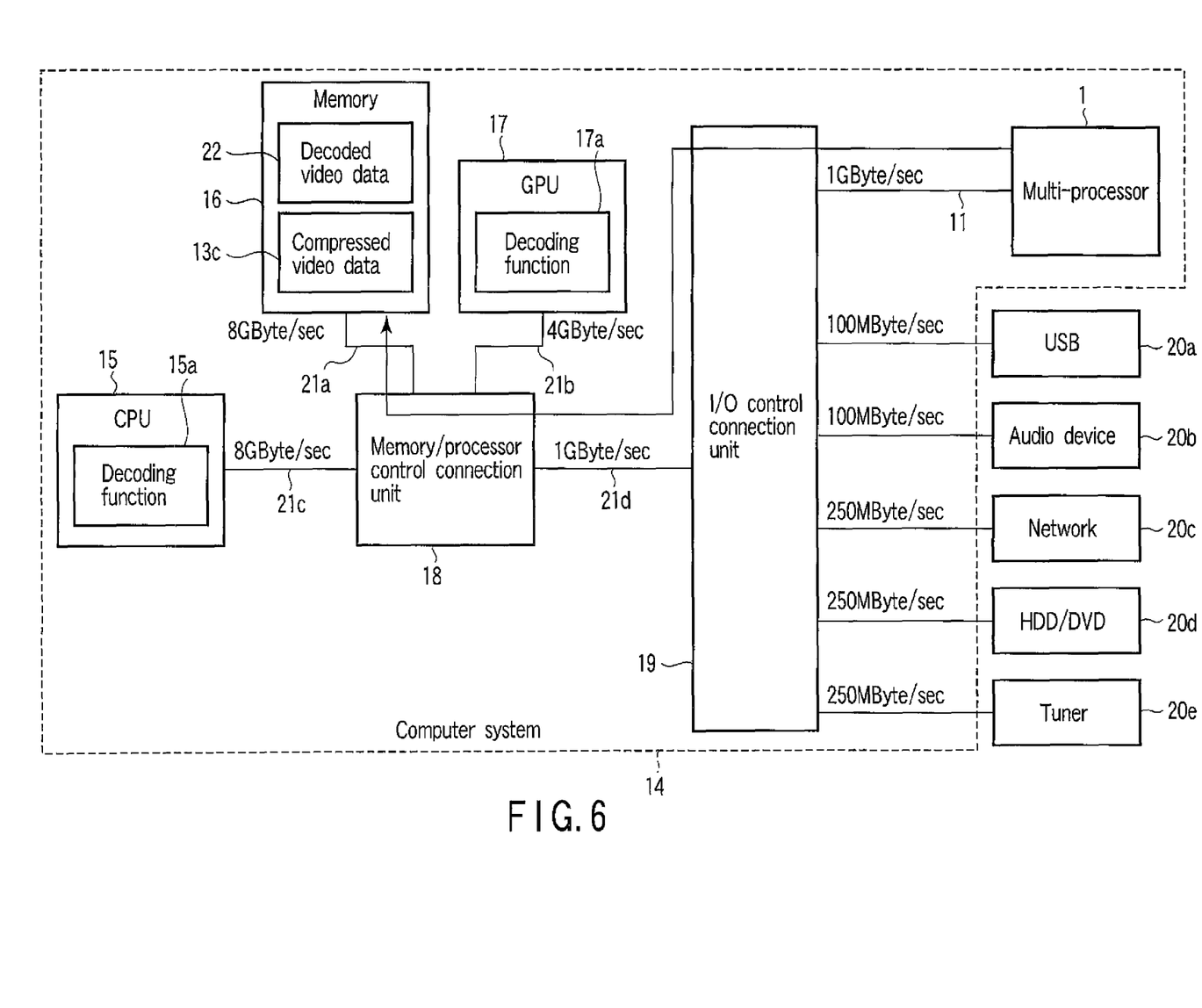
FIG. 6 is a block diagram showing an application example of the multi-processor according to the first embodiment.

FIG. 6 is a block diagram showing an application example of the multi-processor 1 according to this embodiment. FIG. 6 exemplifies a case in which the multi-processor 1 is incorporated in a computer system 14.

In this embodiment, the computer system 14 comprises a CPU 15, a memory 16, a GPU 17, a memory/processor control connection unit 18, an I/O control connection unit 19, and the multi-processor 1.

The computer system 14 acquires data from a USB 20*a*, an audio device 20*b*, a network 20*c*, an HDD or DVD 20*d*, and a tuner 20*e*, and supplies data to the USS 20*a*, the audio device 20*b*, the network 20*c*, and HDD or DVD 20*d*.

The memory/processor control connection unit 18 and the memory 16 are connected to each other via a bus 21*a* having a bandwidth (transfer rate) of, for example, 8 GBytes/sec.

The memory/processor control connection unit 18 and the GPU 17 are connected to each other via a bus 21*b* having a bandwidth of, for example, 4 GBytes/sec.

The memory/processor control connection unit 18 and the CPU 15 are connected to each other via a bus 21*c* having a bandwidth of, for example, 8 GBytes/sec.

The memory/processor control connection unit 18 and the I/O control connection unit 19 are connected to each other via a bus 21*d* having a bandwidth of, for example, 1 GByte/sec.

The I/O control connection unit 19 and the multi-processor 1 are connected to each other via the bus 11 having a bandwidth of, for example, 1 GByte/sec.

Data transfer is performed with a bandwidth of, for example, 100 MBytes/sec between the I/O control connection unit 19 and the USB 20*a* and between the I/O control connection unit 19 and the audio device 20*b*.

Data transfer is performed with a bandwidth of, for example, 250 MBytes/sec between the I/O control connection unit 19 and the network 20*c*, between the I/O control connection unit 19 and the HDD or DVD 20*d*, and between the I/O control connection unit 19 and the tuner 20*e*.

The I/O control connection unit 19 is a chip which connects the devices 20*a* to 20*e* and other constituent elements of the computer system 14.

The memory/processor control connection unit 18 connects the memory 16, the CPU 15, and the GPU 17.

The operation of the computer system 14 will be described below.

The I/O control connection unit 19 receives the compressed video data 13*a* from the USB 20*a*, the audio device 20b, the network 20c, the HDD or DVD 20d, or the tuner 20e, and transfers the compressed video data 13a to the multi-processor 1 via the bus 11.

The multi-processor 1 receives the compressed video data 13a, decodes the data by the internal hardware, executes necessary editing processing by using the editing software 13d, encodes the edited data by using the encoding software 13e, generates the compressed video data 13c in the format handled by the computer system 14, and transfers the compressed video data 13c to the I/O control connection unit 19 via the bus 11.

The I/O control connection unit 19 transfers the compressed video data 13c to the memory/processor control connection unit 18 via the bus 21d.

The memory/processor control connection unit 18 transfers the compressed video data 13c to one of the CPU 15, the memory 16, and GPU 17 via one of the buses 21c, 21a, and 21b.

Upon receiving the compressed video data 13c, the CPU 15 decodes the compressed video data 13c by using a decoding function 15a. The CPU 15 then stores decoded video data 22 in the memory 16 via the bus 21c, the memory/processor control connection unit 18, and the bus 21a.

Upon receiving the compressed video data 13c, the GPU 17 decodes the compressed video data 13c by using a decoding function 17a. The GPU 17 then performs processing for outputting the decoded video data 22.

Note that the GPU 17 may store the decoded video data 22 in the memory 16 via the bus 21b, the memory/processor control connection unit 18, and the bus 21a. The GPU 17 may output the video data 22 decoded by the CPU 15.

The memory 16 stores, for example, the compressed video data 13c or the video data 22 obtained by decoding the compressed video data 13c, and software used by the CPU 15, the GPU 17, and the like.

In contrast, the I/O control connection unit 19 receives compressed video data from one of the CPU 15, the memory 16, and the GPU 17 via one of the buses 21c, 21a, and 21b, the memory/processor control connection unit 18, and the bus 21d. The I/O control connection unit 19 transfers this received compressed video data to the multi-processor 1 via the bus 11.

The multi-processor 1 receives the compressed video data, internally decodes the data, executes necessary editing processing, compresses the edited data again, and transfers the compressed video data to the I/O control connection unit 19 via the bus 11.

The I/O control connection unit 19 outputs this compressed video data to one of the USB 20a, the audio device 20b, the network 20c, and the HDD or DVD 20d.

One of data transferred from one of the CPU 15, the memory 16, and the GPU 17 to the multi-processor 1 and data transferred from the multi-processor 1 to one of the CPU 15, the memory 16, and the GPU 17 may not be compressed.

As described above, in the computer system 14, for data transfer between the CPU 15 and the memory/processor control connection unit 18, between the memory 16 and the memory/processor control connection unit 18, and between the GPU 17 and the memory/processor control connection unit 18, a bandwidth of 8 CBytes/sec or 4 GBytes/sec is set.

In contrast to this, for data transfer between the memory/processor control connection unit 18 and the I/O control connection unit 19 and between the I/O control connection unit 19 and the multi-processor 1, a bandwidth of 1 GByte/sec are set.

That is, the bandwidth for data transfer between the CPU 15 and the memory/processor control connection unit 15, between the memory 16 an the memory/processor control connection unit 15, and between the GPU 17 and the memory/processor control connection unit 15 are larger than the bandwidth for data transfer between the memory/processor control connection unit 18 and the I/O control connection unit 19 and between the I/O control connection unit 19 and the multi-processor 1.

Assume that video data is to be transferred along the route of the I/O control connection unit 19, bus 21d, memory/processor control connection unit 18, bus 21a, and memory 16. In this case, although the bus 21d between the memory/processor control connection unit 18 and the I/O control connection unit 19 has a bandwidth of 1 GByte/sec, since it is necessary to allow data transfer of other data between the memory/processor control connection unit 18 and the I/O control connection unit 19 during the transfer of this video data, the bus 21d cannot use the entire bandwidth of 1 GByte/sec for the transfer of the video data. If a limitation is imposed on the bandwidth at the time of transfer of video data, it sometimes becomes difficult to ensure the real time performance of the video data.

In this embodiment, however, since the compressed video data 13c is transferred between the memory/processor control connection unit 18 and the I/O control connection unit 19, data transfer can be performed with a margin left on the bandwidth of the bus in the computer system 14. This makes it possible to ensure the real time performance of even video data with a large data size.

That is, in this embodiment, since compressed video data is transferred on the bus 21d in the computer system 14, even if data transfers overlap one another, data transfer can be done while the real time performance is ensured.

The above effects are described in detail. For example, the bandwidth required for conventional NTSC data transfer was 320 (width)×240 (height)×3 (colors)×60 (frame/sec)=about 15 MBytes/sec. When, however, video data for high-definition broadcasting is to be handled, a bandwidth of 1920 (width)×1080 (height)×3 (colors)×60 (frame/sec)=about 180 MBytes/sec is required. In order to transfer video data for high-definition broadcasting in one direction and the other direction of a bus, a bandwidth of about 360 MBytes/sec is required. In practice, since it is necessary to transfer control information and the like as well, a larger bandwidth is required.

For example, a bus conforming to the first specification defined such that the number of slots is one (×1) and the bandwidth is 133 MBytes/sec or a bus conforming to the second specification defined such that the number of slots is one (×1) and the bandwidth is 250 MBytes/sec lacks in bandwidth when transferring high-definition broadcasting video data with the above size.

For example, a bus conforming to the second specification defined such that the number of slots is four (×4) has a bandwidth of 1 GByte/sec. However, this bus has a data transfer efficiency of 60% to 70% in a normal state, and one data transfer may overlap another data transfer. This makes it impossible to transfer video data by using the entire bandwidth of 1 GByte/sec. data size of the encoded data encoded by the method such as mpeg2, H.264, or the like, is less than 30 Mbps at the high-definition broadcasting. data transfer rate of the encoded data encoded by the method such as mpeg2, H.264, or the like, is about 4 MBytes/sec and less than 10 MBytes/sec at the high-definition broadcasting In the computer system 14 including the multi-processor 1 according to this embodiment, since video data is transferred upon being compressed in a format corresponding to the computer system 14, it is possible to output even large-volume data such as video data for high-definition broadcasting while ensuring its real time performance.

In the multi-processor 1 according to this embodiment, at least one of the processor elements 4a to 4d, hardware decoding unit 2, and hardware decoding unit 3 generates the compressed video data 13c by decoding, editing, and encoding the compressed video data 13a. However, it suffices to execute processing (transcodec) of converting compressed video data in a given format into compressed video data in another format, as in a case in which data compressed by mpeg2 is converted into data compressed by H.264, without executing editing processing.

In this embodiment, editing processing includes, for example, extracting a highlight scene of a sport program and a specific feature of a news program by using an image processing technique and a sound processing technique. In this case, based on sound changes or breaks, telops of video data, and the like, editing processing is performed to extract, from the video data, data which exceeds a predetermined number of times of playback, data of a portion where the sound volume increases, data having a given feature, video data of a specific person based on facial recognition, and the like.

In addition, editing processing can be the processing of converting video data into data corresponding to an output device, e.g., changing the number of pixels or resolution.

Furthermore, editing processing can be the processing of implementing a user interface, for example, extracting feature points from video data and performing input control on the basis of the gesture of a user included in the video data.

In this embodiment, hardware executes fixed processing (processing that is relatively low in possibility or frequency of being changed), e.g., decoding compressed video data for terrestrial digital broadcasting, decoding compressed video data for BS high-definition broadcasting, and decoding compressed video data stored in a recording medium such as a DVD or a hard disk.

In contrast to this, in this embodiment, one of the processor elements 4a to 4d executes, by using software, processing whose main processing contents are fixed but part of which changes depending on an application, e.g., the processing of performing encoding itself in accordance with predetermined processing contents while changing part of processing contents in accordance with an output destination. More specifically, processor elements operate on the basis of software to implement the processing of encoding data into H.264 data and storing it in, for example, a hard disk or DVD, the processing of encoding data into mpeg2 data and storing it in, for example, a DVD, the processing of executing bit rate conversion of data to mpeg2 data to reduce its volume, and the processing of encoding data into mpeg4 data and storing it in, for example, a portable game machine or portable music player.

Likewise, one of the processor elements executes editing processing such as facial recognition processing, feature point extraction, sound recognition, and telop (character) recognition by using software.

The multi-processor 1 according to this embodiment does not have any video output function and uses the chip set function. Since the multi-processor 1 is not equipped with any texture unit or rastorizer for computer graphics processing, the chip area can be reduced as compared with a GPU. Using the multi-processor 1 makes it unnecessary to use any GPU for transcodec. This allows the GPU to perform processing to be essentially performed and can improve the cost effectiveness of the chip.

The multi-processor 1 according to this embodiment can efficiently execute transcodec, and can perform data transfer while ensuring the real time performance of video data.

Second Embodiment

The second embodiment exemplifies a modification of the multi-processor 1 according to the first embodiment described above.

Figure 7:
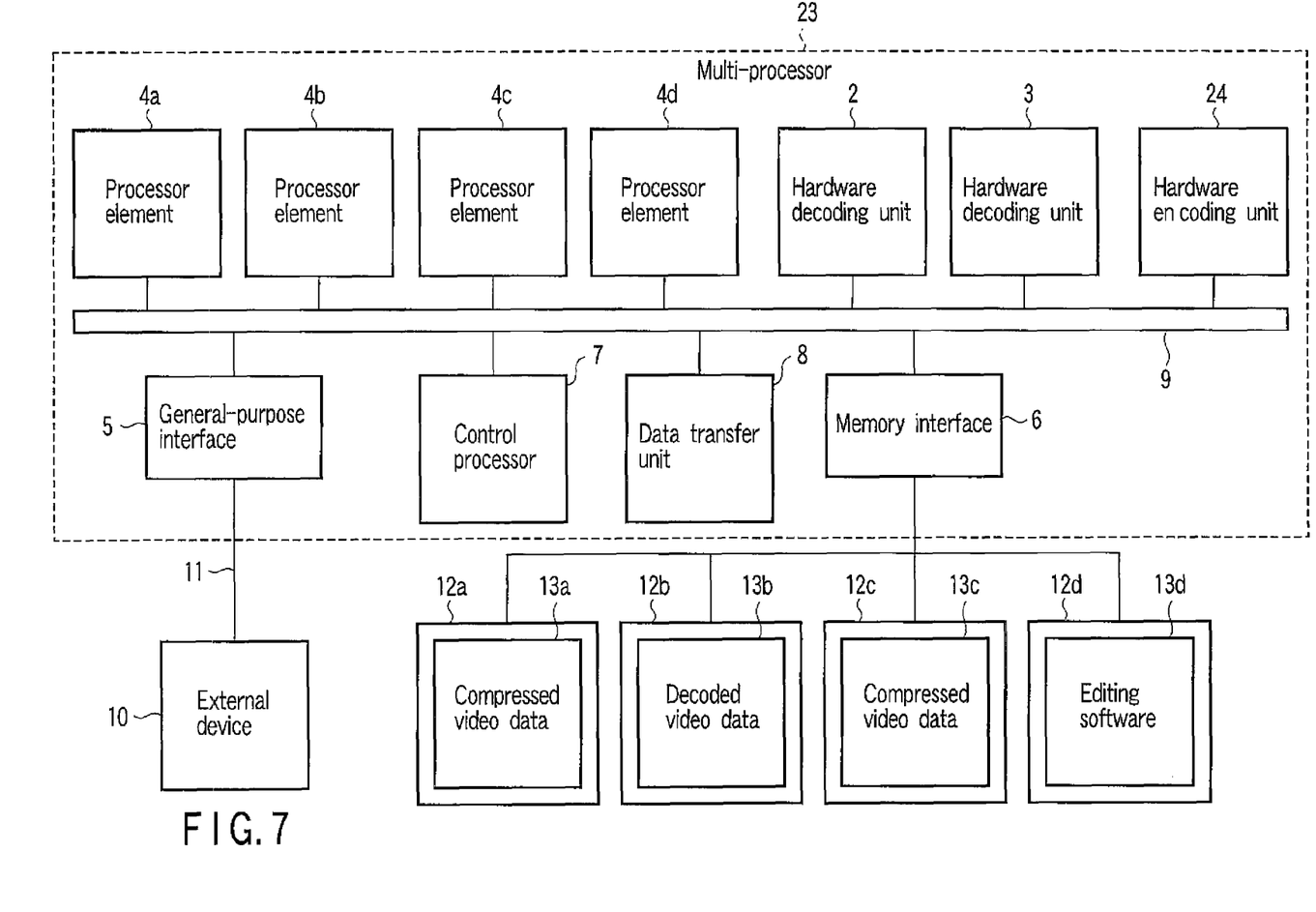
FIG. 7 is a block diagram showing an example of a multi-processor according to the second embodiment of the present invention.

FIG. 7 is a block diagram showing an example of the multi-processor according to this embodiment.

A multi-processor 23 is almost the same as the multi-processor 1 in FIG. 1 but is different from it in that it further includes a hardware encoding unit 24.

In the multi-processor 23, operation up to storing decoded video data 13b in a memory 12b upon receiving compressed video data 13a by a general-purpose interface 5 is the same as that in the multi-processor 1 according to the first embodiment.

In the multi-processor 23, a control processor 7 controls at least one of processor elements 4a to 4d. At least one of the processor elements 4a to 4d accesses editing software 13d stored in the memory 12d, and acquires the decoded video data 13b stored in the memory 12b. This processor element then edits the decoded video data 13b by operation based on the editing software 13d, and transfers the edited data to the hardware encoding unit 24.

The control processor 7 controls the hardware encoding unit 24. The hardware encoding unit 24 encodes edited data and stores compressed video data 13c obtained by encoding in a memory 12c.

The control processor 7 controls a data transfer unit 8. The data transfer unit 8 transmits the compressed video data 13c stored in the memory 12c from the general-purpose interface 5 to the outside.

The multi-processor 23 according to this embodiment described above also executes encoding by hardware. Using the multi-processor 23 according to this embodiment can obtain the same effects as those of the first embodiment. The multi-processor 23 is suitable for encoding as well as decoding when encoding is fixed processing, and can increase the processing speed.

Third Embodiment

The third embodiment will be described, referring to the case where multi processor 1 or 23 described in relation to the foregoing embodiments is provided for a television.

Figure 8:
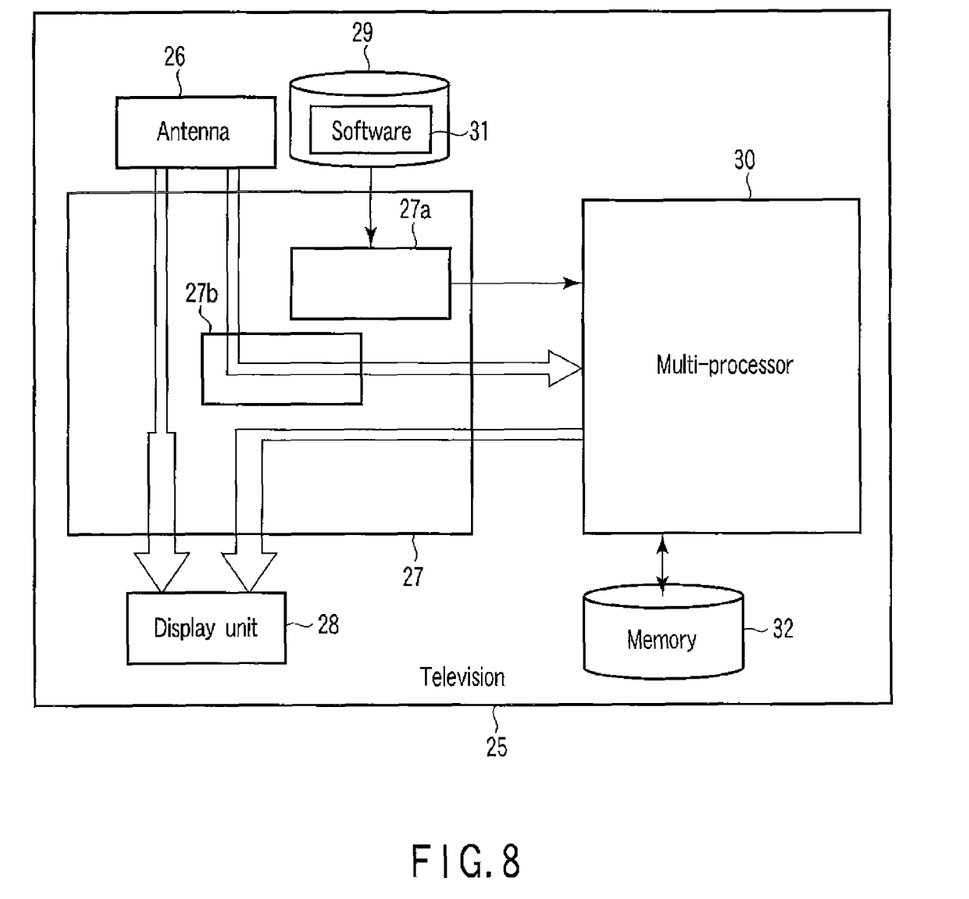
FIG. 8 is a block diagram showing an example of a television which comprises a multi-processor according to the third embodiment of the present invention.

FIG. 8 is a block diagram showing an example of a television provided with a multi processor according to the third embodiment.

The television 25 comprises an antenna 26, a decoder unit 27, a display unit 28, and a memory 29. The memory 29 may be incorporated in the television 25; alternatively, it may be embodied as an external memory. The decoder unit 27 is made of a decoder chip, for example. The display unit 28 is made of an LCD panel, for example.

The television 25 further comprises a multi processor 30 and a memory 32. The television 25 may incorporate the multi processor 30; alternatively, it may employ an external element as the multi processor 30.

A description will now be given of how the structural elements operate where the television 25 is not provided with the multi processor 30 or does not use the multi processor 30.

The antenna 26 receives an encoded data stream. The encoded data stream is, for example, data on terrestrial digital broadcasting, or the like.

The decoder unit 27 decodes an encoded data stream received by the antenna 26, and the decoded data stream is transmitted to the display unit 28.

The display unit 28 performs image display on the basis of the decoded data stream.

A description will be given of the case where the television 25 is provided with the multi processor 30 and this multi processor 30 is used.

The decoder unit 27 has a software transfer function 27a of transmitting software 31 from the memory 29 to the multi processor 30.

The multi processor 30 records the received software 31 in the memory 32, and activates the software 31.

The antenna 26 receives an encoded data stream. The transfer destination switching function 27b of the decoder unit 27 permits the encoded data stream received by the antenna 26 to be transmitted to the multi processor 30.

The multi processor 30 decodes the encoded data stream. The multi processor 30 executes processing based on the software 31 with respect to the decoded data stream. The multi processor 30 encodes the processed data stream. Then, the multi processor 30 transmits the encoded data stream to the decoder unit 27. The memory 32 is used when the multi processor 30 executes processing based on the software 31, decode processing and encode processing.

The processing based on the software 31 includes processing for increasing or decreasing a frame rate, IP conversion processing, resolution conversion processing, and various kinds of image processing such as image frame-interpolation processing.

The decoder unit 27 decodes the encoded data stream received from the multi processor 30 and transmits the decoded data stream to the display unit 28.

The display unit 28 performs image display on the basis of the decoded data stream.

Figure 9:
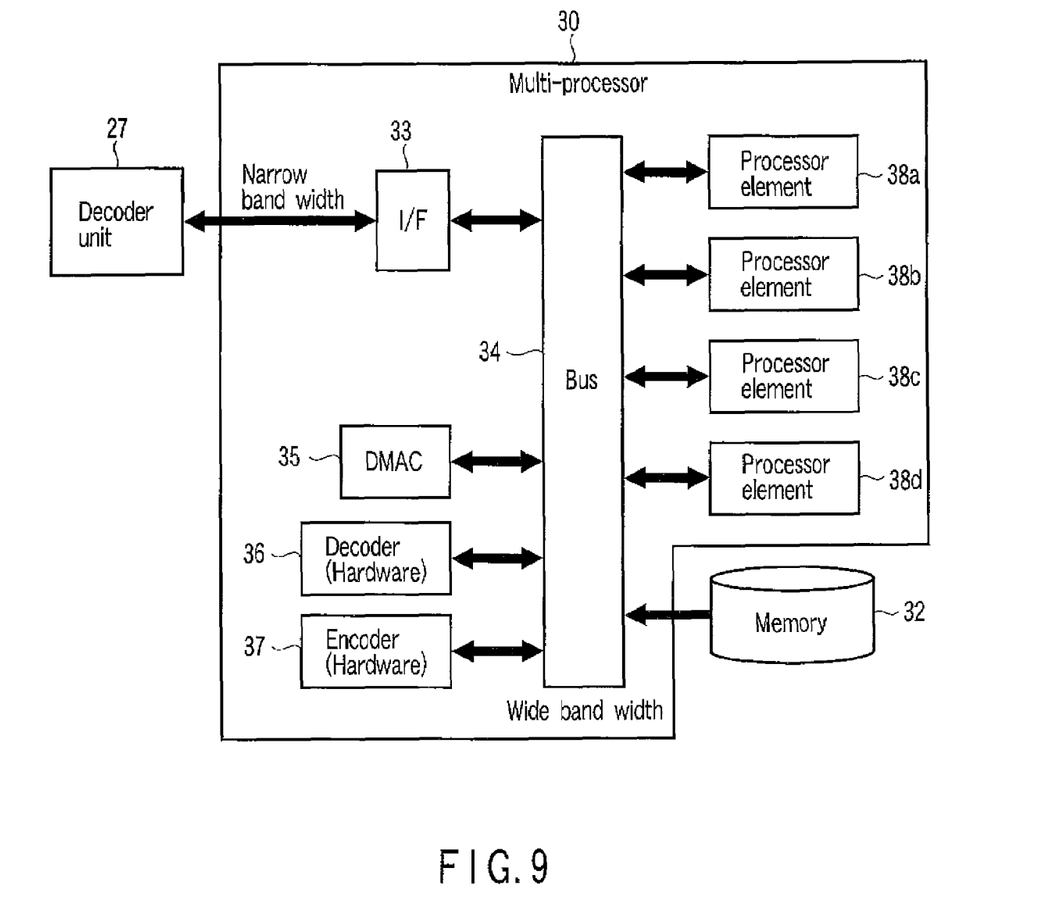
FIG. 9 is a block diagram showing an example of a multi-processor according to the third embodiment.

FIG. 9 is a block diagram showing an example of the multi processor 30 provided for the television 25.

The multi processor 30 includes an interface 33, a bus 34, a DMAC 35, a hardware-decoder 36, a hardware-encoder 37, and processor elements (processor engines) 38a-38d such as a digital signal processor (DSP).

The data transfer between the decoder unit 27 and the interface 33 is executed, using a band which is narrower than that used by the data transfer performed inside the multi processor 30 or that used by the data transfer performed between the bus 34 and the memory 32.

The memory 32 is a memory used by the processor elements 38a-38d, the hardware-decoder 36 and the hardware-encoder 37.

The DMAC 35 controls the data transfer performed between the structural elements of the multi processor 30 through the use of the bus 34. In addition, the DMAC 35 controls the data transfer performed between the memory 32 and the structural elements of the multi processor 30 through the use of the bus 34.

The software 31 is supplied from the decoder unit 27 to the memory 32 by way of the interface 33 and the bus. The software 31 is stored in the memory 32.

The encoded data stream is supplied from the decoder unit 27 to the memory 32 by way of the interface 33 and the bus 34. The encoded data stream is stored in the memory 32.

The hardware-decoder 36 reads the encoded data stream from the memory 32 by way of the bus 34, decodes the read data stream, and supplies the decoded data stream to the memory 32 through the bus 34. The decoded data stream is stored in the memory 32.

The processor elements 38a-38d read the software 31 from the memory 32 through the use of the bus 34, and executes the read software 31. The processor elements 38a-38d execute image processing with respect to the decoded data stream stored in the memory 32. The processor elements 38a-38d supplies the processed data stream to the memory 32 by way of the bus 34. The processed data stream is stored in the memory 32.

The hardware-encoder 37 receives the processed data stream which is supplied thereto from the memory 32 through the bus 34. The hardware-encoder 37 encodes the processed data stream. The hardware-encoder 37 supplies the encoded data stream to the memory 32 by way of the bus 34. The encoded data stream is stored in the memory 32.

The encoded data stream 34 stored in the memory 32 is transmitted to the decoder unit 27 by way of the bus 34 and the interface 33.

In the third embodiment, the encoded data stream is transferred from the decoder unit 27 to the multi processor 30. The multi processor 30 decodes the encoded data stream and records it in the memory 32.

The processor elements 38a-38d process the decoded data stream, encode the processed data stream, and supply the encoded data stream back to the decoder unit 27. Owing to this feature, the third embodiment can save the transmission band which may be required between the decoder unit 27 and the multi processor 30. In addition, various kinds of processing can be executed with respect to the data stream.

The third embodiment is advantageous in that various image processing functions can be realized by using a narrow-band bus (which is only required to enable transmission of an encoded data stream) and by additionally employing the multi processor 30 and the memory 32.

In the third embodiment, the multi processor 30 encodes a data stream once again after image processing, and then supplies the encoded data stream back to the decoder unit 27.

Owing to this feature, the decoder unit 27 can uniformly handle both the encoded data stream received from the antenna 26 and the encoded data stream received from the multi processor 30. For example, the encoded data stream received from the antenna 26 and the encoded data stream received from the multi processor 30 can be in the form of mpeg2 TS format, in which case the decoder unit 27 decodes a data stream of the mpeq2 TS format.

In the third embodiment, software may be used for the switching the multi processor 31 between the mode in which the hardware-decoder 36 is used and the mode in which the hardware-encoder 37 is used. In addition, the multi processor 30 may be configured to receive data stream which has not yet been encoded. Furthermore, the multi processor 30 may be configured to transmit a processed data stream to a decoder unit without encoding the processed data stream.

The above embodiments exemplify the cases in which the data handled by the multi-processors 1 and 23 and the computer system 14 are video data. However, the present invention can be applied to other data in the same manner.

In addition, the multi-processor 1 or 23 can be provided for devices such as a DVD recorder as well as being applied to the computer system 14 such as a personal computer.

The multi-processors 1 and 23 according to the respective embodiments can temporarily store edited data and encode the edited data stored in the memory upon accessing it.

In the multi-processors 1 and 23 according to the respective embodiments, the operations of the control processor 7 and data transfer unit 8 may be implemented by processor elements.

What is claimed is:

1. A multi-processor comprising:
a first control unit which stores first compressed data in a first memory, wherein the first compressed data was received from an external device;
a decoding unit configured to access first compressed data stored in a first memory, generate decoded data by decoding the first compressed data stored in the first memory and stores the generated decoded data in a second memory;
an editing processor element including at least one processor element configured to generates edited data by processing the decoded data to change the number of pixels or resolution of the decoded data stored in the second memory, wherein the processing is accomplished using editing software stored in a third memory;
an encoding processor element including at least one processor element configured to encode the edited data generated by the editing processor element to generate second compressed data and store the second compressed data in a fifth memory, wherein the encoding is accomplished using encoding software stored in a fourth memory; and
a second control unit which outputs the second compressed data stored in the fifth memory to the external device from which the first compressed data was received or another external device.

2. A multi-processor according to claim 1, wherein
the first compressed data is compressed video data, and
a data size of the second compressed data is a size that allows transfer of the data with a bandwidth of an external bus even if the transfer of the data overlaps transfer of another data on the external bus.

3. A multi-processor according to claim 1, wherein the editing processor element extracts a highlight scene or a specific feature of the decoded data.

4. A multi-processor according to claim 1, further comprising:
an interface which is connected to the external device via an external bus; and an internal bus which connects between the interface, the hardware decoding unit, the editing processor element, and the encoding processor element,
wherein a band width of the external bus is narrower than a band width of the internal bus.

5. A multi-processor comprising:
a first control unit which stores first compressed data in a first memory, wherein the first compressed data was received from an external device;
a decoding unit configured to access first compressed data stored in a first memory, generate decoded data by decoding the first compressed data stored in the first memory and store the generated decoded data in a second memory;
an editing processor element including at least one processor element configured to generate edited data by processing the decoded data to change the number of pixels or resolution of the decoded data stored in the second memory, wherein the processing is accomplished using editing software stored in a third memory;
a hardware encoding unit configured to encodes the edited data generated by the editing processor element to generate second compressed data and stores the second compressed data obtained by encoding in a fourth memory; and
a second control unit which outputs the second compressed data stored in the fourth memory to the external device from which the first compressed data was received or another external device.

6. A multi-processor according to claim 5, wherein
the first compressed data is compressed video data, and
a data size of the second compressed data is a size that allows transfer of the data with a bandwidth of an external bus even if the transfer of the data overlaps transfer of another data on the external bus.

7. A multi-processor according to claim 5, wherein
the editing processor element stores the edited data in a fifth memory, and
the hardware encoding unit encodes the edited data stored in the fifth memory.

* * * * *